Figure 1:
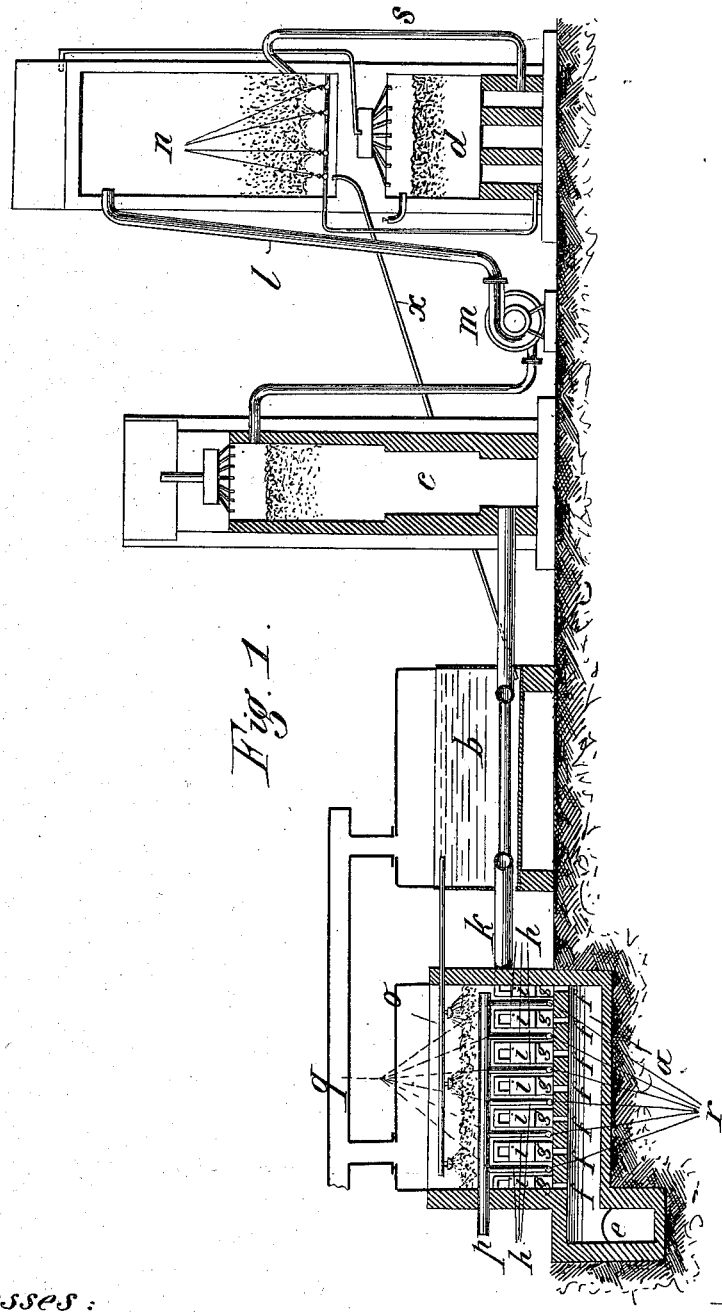

No. 734,849. PATENTED JULY 28, 1903.
G. GIN.
PROCESS OF MAKING SULFURIC ACID.
APPLICATION FILED OCT. 6, 1902.
NO MODEL. 2 SHEETS—SHEET 1.

Witnesses:
E. H. Darusch.
L. C. Waldman

Inventor:
Gustave Gin
per B. Singer,
Attorney

No. 734,849. PATENTED JULY 28, 1903.
G. GIN.
PROCESS OF MAKING SULFURIC ACID.
APPLICATION FILED OCT. 6, 1902.
NO MODEL. 2 SHEETS—SHEET 2.

Witnesses
Ed. Hamisch.
L. Waldman

Inventor
Gustave Gin
per B. Singer
Attorney

No. 734,849. Patented July 28, 1903.

UNITED STATES PATENT OFFICE.

GUSTAVE GIN, OF PARIS, FRANCE.

PROCESS OF MAKING SULFURIC ACID.

SPECIFICATION forming part of Letters Patent No. 734,849, dated July 28, 1903.

Application filed October 8, 1902. Serial No. 126,107. (No specimens.)

*To all whom it may concern:*

Be it known that I, GUSTAVE GIN, a citizen of the French Republic, and a resident of Paris, France, have invented certain new and useful Improvements in the Manufacture of Sulfuric Acid by Means of Processes of Contact, of which the following is a specification.

The difficulties of manufacture of sulfuric anhydrid by means of processes of contact proceed especially from the destruction of the catalytic power of substances of contact under the influence of impurities contained in the gas from the roasting of sulfureted ores. The effects of these impurities may be purely mechanical, such as the obstruction of the apparatus and the fouling of the catalytic masses by the dust entrained in the gaseous stream. Other impurities act by chemical reaction on the substances of contact. It is thus that the platinum asbestos rapidly loses its catalytic properties in the presence of very small quantities of arsenic, phosphorus, mercury, &c. There is then necessity to submit the gases leaving the roasting-furnace to a preliminary treatment which will rid them at the time of the dust mechanically entrained and of the impurities which encourage the chemical alteration of the masses of contact. Up to the present this purification of the gases has been realized by washing and by injections of steam, of which the useful effect is incontestable, but of which the realization is delicate and subordinated to a permanent control.

I obtain the complete purification of the gases in substituting for the washing by water and steam the systematic dissolution in the water of the sulfurous anhydrid, so that the inert gases and solid or gaseous impurities which accompany it can be separated. The sulfurous anhydrid is then extracted from its solution in a state nearly chemically pure and afterward mixed with the quantity of air necessary for the integral transformation of sulfurous anhydrid into sulfuric anhydrid. The mixture is then sent to the catalytic apparatus. The cycle traveled by the gases after leaving the roasting-furnace until the entry into the catalyzers consists of the following operations, of which the realization is simple and the effect certain, and which are put into effect in the apparatus represented in the annexed drawings, in which—

Figure 2:
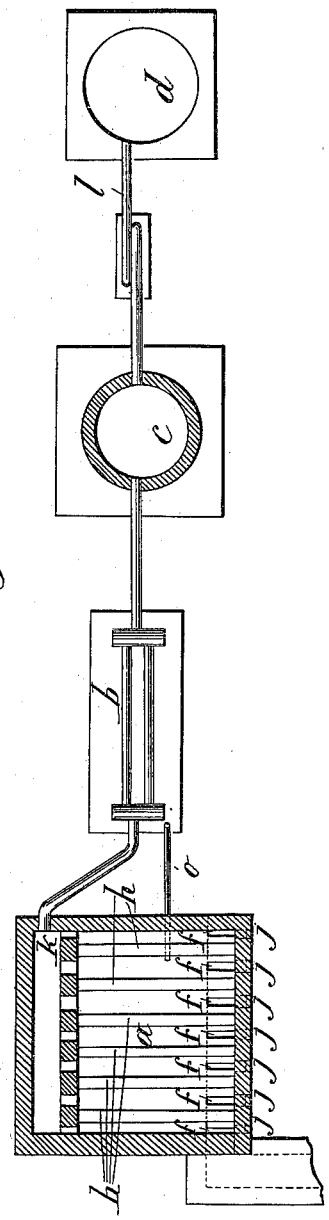

Figure 1 is a longitudinal sectional elevation through a chain of apparatus representing the series of steps constituting my process, and Fig. 2 is a partly horizontal section and partly a top plan view of said apparatus.

The hot gases proceeding from the roasting-furnaces are drawn into the apparatus, to which the following quadruple effect applies: (*a*) It serves as an eliminator for all the solid materials entrained; (*b*) it plays the role of exchanger of temperatures between the hot gases which it is necessary to cool in order to ultimately dissolve them and the cold solutions which it is necessary to heat in order to disengage the sulfurous anhydrid; (*c*) it realizes the extraction of the sulfurous anhydrid by direct heat combined with the mechanical action of a current of hot air injected into the liquid; (*d*) lastly, it effects the mixture of the sulfurous anhydrid with a sufficient quantity of air to realize the integral oxidation in the catalytic apparatus.

The furnace-gases enter the apparatus by the flue *e*, and thence pass on by the orifices *f* into the baffled channels *g*, of which the lateral walls constitute the envelop of the extraction-chambers *h*, in which circulates the solution from which it is desired to disengage the sulfurous anhydrid. The gases deposit on the diaphragms *i* the major part of the solid materials entrained, which can be removed by the orifices *j*. After being freed from their dust and having given up a part of their heat the gases escape from the extractor by the orifice *k* and traverse the refrigerator *b* to pass on to a tower *c*, where they are washed by sulfuric acid, which deprives them of the sulfuric anhydrid which they contain. The furnace-gases thus cooled and rid of the sulfuric anhydrid are then driven to the dissolution-tower by the aid of the fan *m* by the pipe *l* entering at the upper part of the tower and meeting the cold water atomized by the atomizers *n*. The gases very nearly exhausted pass by the pipe *s* into the the small tower *d*, where they meet pure water gushing onto coke. It is this water, lightly charged with $SO_2$, which is atomized by the aid of the atomizers *n*. The insoluble gases are evacuated into the atmosphere. The saturated solution passes through pipe $x$ into the apparatus $b$, where it goes for the cooling of the gases. It then enters into the extractor $a$ and is injected at the upper part thereof by the pipe $o$, which distributes it onto the refractory materials, where it divides itself and commences to lose its sulfurous acid by contact with the mixture of air introduced into the apparatus by the pipe $p$, which carries the adductors $q$, communicating, respectively, with a tube $r$, pierced with holes, by which the air, previously heated, escapes under pressure across a bed of liquid of some centimeters thickness, from which it mechanically expels the sulfurous anhydrid which has escaped by the action of the hot air into the prismatic chambers, where the solution, reheated by the furnace-gases, gushes out.

Having now fully described my said invention, what I claim, and desire to secure by Letters Patent, is—

The improvement in the art of manufacturing sulfuric acid, consisting in first cooling the gases of sulfureted ores as the former come from the furnace, and ridding them of the solid matters held in suspension, by deposit, then subjecting them to refrigerative action, next depriving them of sulfuric anhydrid by washing with sulfuric acid, after that spraying them with cold water slightly acidulated with sulfurous anhydrid, then submitting them to a heating action, next conducting the saturated solution, by this time formed, through a bed of refractory material, when it divides itself and begins to lose its sulfurous acid by contact with an air mixture, and finally expelling the sulfurous anhydrid from the liquid bed by hot air bubbled up from beneath, which mixes sufficiently with the sulfurous anhydrid to realize the integral oxidation in the catalytic operation.

In testimony whereof I have hereunto set my hand in presence of two witnesses.

GUSTAVE GIN.

Witnesses:
 ADOLPHE STURM,
 EDWARD P. MACLEAN.